May 21, 1968 B. LYALL ETAL 3,384,815
MOISTURE CONTENT MEASURING METHOD AND APPARATUS INCLUDING
A ROLLER FOR PERIODICALLY CONTACTING A FLEXIBLE
TRAVELLING SHEET MEMBER
Filed Nov. 19, 1963 2 Sheets-Sheet 1
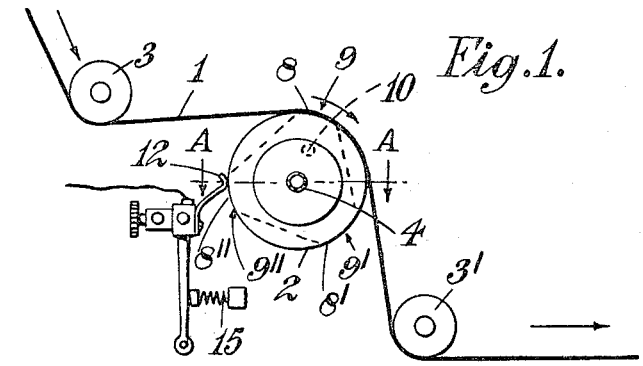
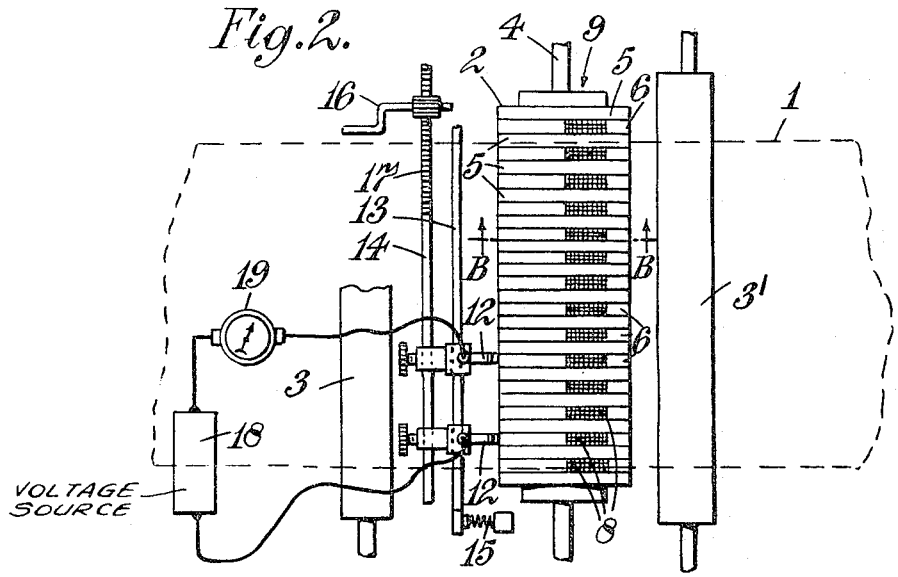
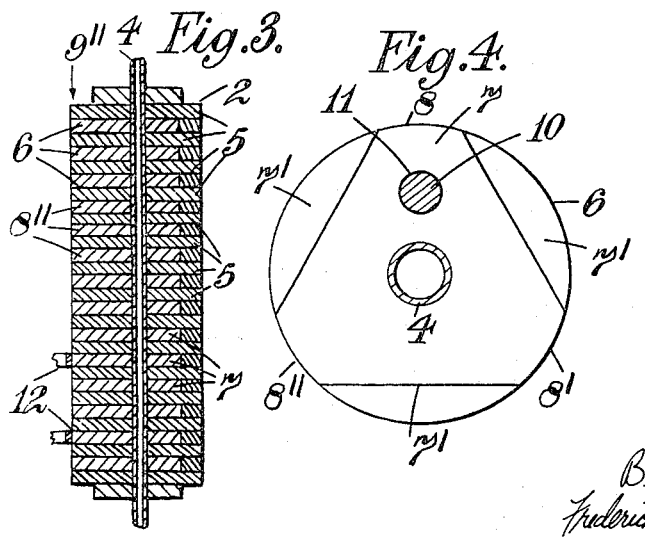

INVENTORS

Brian Lyall
Frederick Albert Edward Baker

United States Patent Office 3,384,815
Patented May 21, 1968

3,384,815
MOISTURE CONTENT MEASURING METHOD AND APPARATUS INCLUDING A ROLLER FOR PERIODICALLY CONTACTING A FLEXIBLE TRAVELLING SHEET MEMBER
Brian Lyall and Frederick Albert Edward Baker, Bridgwater, Somerset, England, assignors to British Cellophane Limited, Bridgwater, Somerset, England, a British company
Filed Nov. 19, 1963, Ser. No. 324,637
Claims priority, application Great Britain, Nov. 23, 1962, 44,477/62
6 Claims. (Cl. 324—65)

ABSTRACT OF THE DISCLOSURE

This invention relates to apparatus for measuring the moisture content of a selected portion of a flexible traveling sheet material. The sheet material passes over an arc of the surface of a freely rotatable electrically insulating roller, there being two electrically conducting segments spaced from each other in the surface of the roller and two corresponding contact members spaced from the electrically conducting segments, each being electrically connected to a corresponding segment. Two stationary brushes are arranged to make contact with the two contact members only during the period that the two conducting segments are passing through the sheet-supporting arc so that the electrical current supplied through the brushes can be measured with a current meter, this being a measure of the moisture content of the sheet material.

---

This invention relates to measurement of the water content of flexible sheet materials.

Many flexible sheet materials, such as cellulose film and paper, have the property of retaining water to a variable degree and it is often desirable to know how much water is retained in the sheet material and to what extent the water is retained in selected portions of the sheet, even after the sheet has been coated with water vapour impermeable coating compositions. The water is usually initially introduced into the sheet material during manufacture and/or during the application of coating compositions, such as aqueous dispersions, to the material.

It is generally known that a measure of the water content of a sheet material can be obtained by measuring its electrical conductivity. This may be carried out by passing a travelling sheet material over a pair of spaced rollers between which an electrical potential difference is applied and by measuring the resulting electrical current which flows through the sheet material. However, this simple method has disadvantages in that changes in the water content of the sheet material across its width cannot be detected and electrostatic charges induced in the sheet material on passing over the rollers cause the sheet material to cling to the rollers so that on withdrawal from the rollers undesirable puckering of the sheet material is liable to occur.

It is now found that these disadvantages may be overcome by the present invention.

According to the present invention an apparatus for measuring the moisture content of a selected portion of a flexible travelling sheet material comprises an electrically non-conducting movable surface for making contact with the sheet material, the movable surface having at least two spaced electrically conducting segments across the width of the surface, a connecting means for connecting a voltage supply across two selected segments when the sheet material is in contact with the segments and disconnecting the voltage supply before the sheet material leaves the segments and a current meter for measuring the flow of current in the electrical circuit including the sheet material between the selected segments.

In a preferred form of the invention, the movable surface is a rotatable roller and the sheet material is supported by the roller as it is led over an arc of the roller surface. As it is necessary that the segments on the roller surface are completely covered by the sheet material before the voltage supply is connected across the segments and the voltage supply is disconnected before the sheet material leaves the segments in order to permit any electrostatic charges induced in the sheet to dissipate before the sheet is removed from the roller, the angle subtended by each segment at the centre of the roller is smaller, and preferably substantially smaller, than the angle subtended by the sheet-supporting arc of the roller surface.

It is preferred that the angle substended by each segment at the centre of the roller is less than one half of the angle substended by the sheet-supporting arc of the roller surface.

The roller may be hollow and the connecting means comprise two stationary brushes within the roller placed such that they are swept by the underside of the selected segment during rotation of the roller and make and break contact with the segments during the period the segments are entirely within the sheet-supporting region of the roller surface. If desired, two or more groups of segments may be arranged equidistantly around the circumference of the roller so that two or more independent measurements of the water content of the sheet material can be made during each revolution of the roller.

In a more preferred form of the invention, the roller is solid and has at least two groups of segments spaced equidistantly around the roller surface, corresponding segments in each group being electrically interconnected. Two external stationary brushes are provided for connecting the voltage supply to two selected segments in one group of segments while a second group of segments is passing through the sheet supporting region of the roller surface so that the corresponding pair of segments in the second group is energized and disconnected during the period the second group of segments is passing through the sheet supporting region of the roller surface and is entirely covered by the sheet material.

The roller may comprise, for example, an assembly of electrically insulating discs alternating with segmented discs, each segmented disc having an electrically non-conducting periphery aspect for at least two electrically conducting segments at equidistant spaced positions around the periphery of the disc, the segments being interconnected electrically within the disc.

In this form of the invention, it is an essential feature that not more than one group of segments is in contact with the sheet material at any one instant of time. Thus the size of the arc described by the sheet material in contact with the roller and that of the segment limits the number of series of segments employed on the roller. For example, where the angle subtended at the centre of the roller by the sheet-supporting arc of the roller subtends an angle of about 90° at the axis of rotation of the roller, the number of groups of segments employed cannot exceed three.

As described above, the positioning of the brushes and the length of the segments in the direction of rotation of the roller are such that the voltage is applied to the two selected segments when the segments are entirely in contact with the sheet material and the voltage supply is disconnected before the sheet material is withdrawn from the surface to permit the substantial dissipation of any induced electrostatic charges in the sheet material. If the sheet material is drawn from the roller before the voltage supply is disconnected and before the electrostatic charges have substantially dissipated, undesirable puckering of the sheet material occurs. Normally, the electrostatic charges will decay within a few milliseconds after disconnection of the voltage supply.

The apparatus may be used for measuring the water content of any flexible sheet material, for example cellulose film and paper, and is particularly applicable for measuring the water content of sheet materials coated with water vapour-impermeable coating compositions, for example cellulose film coated with a vinylidene chlorine copolymer coating composition.

Although other constituents in the sheet material may affect conductivity, normal variations in the concentrations of these constituents have a negligible effect when compared with the changes in conductivity due to variations in water content.

The voltage employed will, of course, be dependent upon the conductivity of the portion of sheet material under test, but it is usually selected to give a current reading of the order of 1 to 5 microamps. For example, for testing a portion of plain uncoated cellulose film about six inches in width, a voltage of about 600 volts is sufficient whereas if the cellulose film is coated with a vinylidene chloride coating composition, at least 800 volts is required and more preferably about 1500 volts, in order to penetrate the coating and obtain a significant reading on a microammeter.

The reading of the microammeter may be directly calibrated to read percentage water content for a particular sheet material of standard thickness by carrying out conductivity measurements on samples having a known water content which has been determined by other methods.

The apparatus in accordance with the invention is particularly useful for detecting variations in coating thicknesses where the coating composition has been applied from an aqueous dispersion. Assuming that the base material had, initially, a uniformly distributed water content on application of the coating, the portions of the sheet material immediately below the thicker portions of coating will take up and retain during drying more water than the portions of sheet material below the thinner coatings. Thus, a measure of the water content of the coated sheet material at intervals across the width of the material will indicate changes in thickness of the coating.

The present invention also includes a method for measuring the moisture content of a selected portion of a flexible travelling sheet material comprising bringing the sheet material into contact with a movable surface, applying an electrical potential difference across a selected portion of the width of the sheet material, measuring the electric current flow through the sheet material, disconnecting the applied electrical potential difference and withdrawing the sheet material from the surface after the dissipation of any residual electrostatic charge from the sheet.

Specific examples of apparatus constructed in accordance with the invention and a method of use of the apparatus will now be described with reference to the drawings in which, FIGURE 1 is a diagrammatic side elevation of one form of the apparatus;

FIGURE 2 is a plan view of FIGURE 1;

FIGURE 3 is a longitudinal section through A—A of FIGURE 1;

FIGURE 4 is an enlarged transverse section through B—B of FIGURE 2;

Figure 5:
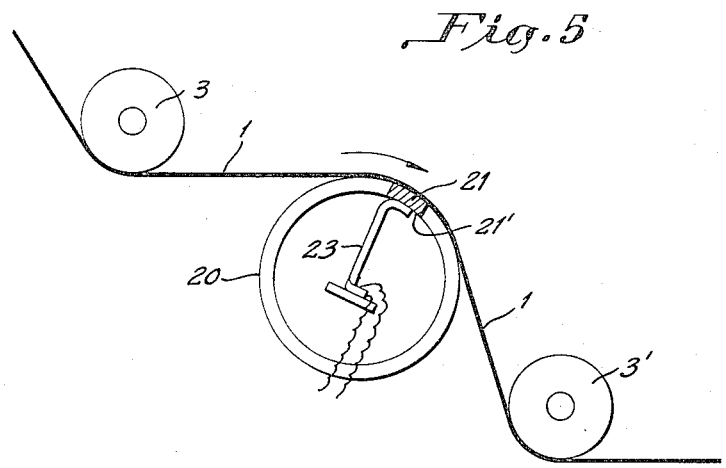
FIGURE 5 is a diagrammatic side elevation of another form of the apparatus.

In FIGURES 1 and 2, a flexible travelling sheet material 1 containing a proportion of water within its structure, for example a regenerated cellulose film 0.001 inch thick and coated on both sides with a vinylidene chloride copolymer coating composition 0.00005 inch thick which has been applied from an aqueous dispersion, is caused to travel in contact with the surface of a freely rotatable roller 2 over an arc subtending an angle of about 80° at the centre of the roller 2, by means of guiding rollers 3, 3'. The roller 2 (FIGURE 3) consists of a shaft 4 on which a series of discs 5, 6 are mounted tightly together such that the edges of the discs 5, 6 form the surface of the roller 2. Alternate discs 5 are formed of suitable electrically insulating material such as polyethylene or polymethylmethacrylate and the intervening discs 6 (FIGURE 4) each consist of an electrically conducting body portion 7 having the form of an equilateral triangle with the corners rounded off and bounded along its sides with insulating portions 7'. The three rounded off corners are exposed at the edge of the disc 6 form conductive segments 8, 8', 8". The arc described by each of the segments 8, 8', 8" subtends an angle of 30° at the axis or rotation of the roller 2. The discs 6 are so oriented that the segments 8, 8', 8" of each disc 6 lie in line across the surface of the roller 2 to form three groups 9, 9' and 9" and are fixed against relative rotation by a plastic rod 10 fitted through holes 11 in the discs 5, 6.

Two brushes 12 slidably mounted on a rail 13 and fixed a predetermined distance apart on a rod 14 are pressed into contact with the surface of the roller 2 not covered by the sheet material 1 by means of a spring 15. The brushes 12 are so spaced that they make contact with a selected pair of segments 8" and are so placed around the circumference of the roller 2 that contact with the segments 8" only takes place during the period the sheet material 1 is lying completely over the segments 8. The brushes 12 may, if desired, be moved laterally along the roller 2 to contact a further pair of segments 8" by means of a handle 16 working on a rack formed on the end of the rod 14.

A direct current voltage supply source 18 of 1500 volts is connected to the brushes 12 through a damped microammeter 19.

The apparatus operates as follows:

As the sheet material 1 is drawn over the roller 2 at, for example, a speed of 60 metres/minute, causing the roller 2 to rotate, the groups 9, 9' and 9" of segments 8, 8' and 8" are successively brought into contact with the sheet material 1. When, for example, the group 9 of segments 8 is in contact with the material 1 a selected pair of the segments 8 become energised with 1500 volts due to the corresponding pair of segments 8" sweeping over the brushes 12. An electric current will then flow through the portion of the sheet material 1 lying between the selected pair of segments 8 and will be recorded by the microammeter 19. The magnitude of the current will be a measure of the water content in that portion of the sheet material 1. While the material 1 is still in contact with the group 9 of segments 8 the group 9" of segments 8" sweeps past the brushes 12 and the voltage is disconnected from the segments 8". The sheet material 1, however, is maintained in contact with the group 9 of segments 8 for a short arc of travel after disconnection of the voltage supply to permit any electrostatic charges induced in the material 1 to dissipate to such an extent that there is no drag which leads to puckering of the material 1 on withdrawal of the material from the roller 2.

As the roller 2 continues to rotate, the group 9" of segments 8" comes into contact with a further portion of the sheet material 1 and the group 9' of segments 8' commences to sweep the brushes 12. As before, a selected pair of segments 8" is energised and the current passing through the portion of material 1 between the selected segments 8" is measured by the microammeter 19. Thus, a determination of conductivity and hence a measure of water content of successive portions of material 1 is carried out each time a group 9, 9', 9" of segments 8, 8', 8" comes into contact with the material, and changes in water content along the length of the material 1 passing between the pair of selected segments will readily be seen by observing the microammeter 19. Each determination gives rise to a pulse of current through the microammeter 19 which, through being damped, gives a substantially steady reading. Changes in water content at selected positions across the width of the material 1 may be determined by moving the brushes 12 laterally by means of the handle 16 in order to select a further pair of segments lying in the path of a new portion of the travelling material 1. The portion of the width of the material 1 over which the water content is determined may be increased or decreased as desired by the adjustment of the distance apart of the brushes 12 on the rod 14.

If desired, the microammeter 19 may be calibrated directly in percentage water content of the sheet material by passing through the apparatus a similar material of which the percentage water content is known, having been previously measured by other means.

Figure 6:
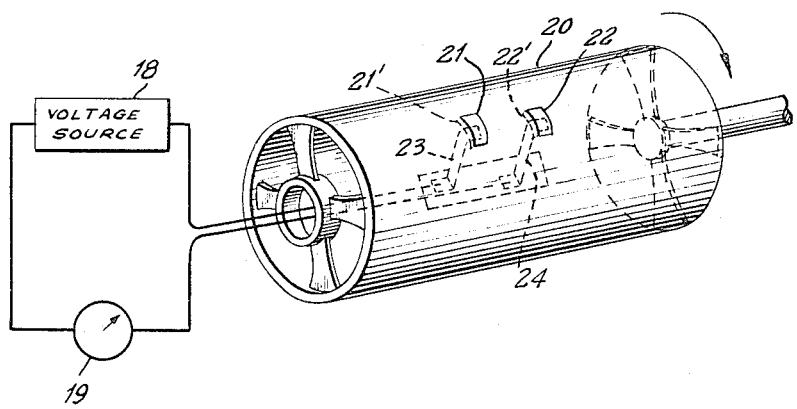
FIGURE 6 is a perspective view of part of FIGURE 5.

Referring to FIGURES 5 and 6, the flexible travelling sheet material 1 is passed over an arc of a freely rotatable hollow roller 20 constructed from an electrically insulating material. Two segments 21, 22 of an electrically conducting material are set into the roller surface in a preselected spaced relationship across the width of the roller 20 and extend to the inner surface of the hollow roller to form contact members 21', 22' which make contact with two stationary electrically conducting brushes 23, 24 fixed within the roller 2. The angle subtended by the segments 21, 22 at the center of the roller 20 is less than half the angle subtended at the center of the roller 20 by the sheet-supporting arc of the roller surface. The position of the brushes 23, 24 is fixed so that the brushes 23, 24 make contact with and become disconnected from the segments 21, 22 during the period the segments 21, 22 are entirely within the arc of the roller 20 covered by the sheet material 1.

The brushes 23, 24 are connected to a voltage source 18 through a damped microammeter 19 as described in the description of FIGURE 2.

The apparatus shown in FIGURES 5 and 6 operates in a manner similar to the apparatus shown in FIGURES 1 and 2, namely, as the segments 21, 22 pass through the arc of the roller which supports the sheet material 1, a voltage is applied to the segments 21, 22 through the brushes 23, 24 from the voltage source 18 and the current passing in indicated by the microammeter 19. The voltage is disconnected from the segments 21, 22 by the segments 21, 22 breaking contact with the brushes 23, 24 before the segments 21, 22 pass out of the sheet material supporting arc of the roller 20 to permit electrostatic charges to dissipate and thus prevent drag and puckering upon the sheet material 1 leaving the roller. The damped pulses of current indicated by the microammeter 19 will be a measure of the resistance (and hence the water content) of the portions of sheet material 1 which lie upon the roller 20 between and in contact with the segments 21, 22.

We claim:
1. A method for measuring the moisture content of a selected portion of a flexible travelling sheet material comprising the steps of bringing the sheet material into contact with a movable non-electrically conductive surface having transversely spaced electrodes, applying an electrical potential difference through the electrodes across a selected portion of the width of the sheet material, in contact with said movable surface, measuring the electric current flow through the sheet material, disconnecting the applied electrical potential difference, leaving the selected portion in contact with said surface, whereby any residual electrostatic charge is dissipated from said portion, and withdrawing the sheet material from the surface.

2. A method as claimed in claim 1 in which the sheet material is a cellulose film having an aqueous coating composition thereon.

3. Apparatus for measuring the moisture content of a selected portion of a flexible travelling sheet material comprising an electrically non-conductive rotatable roller for supporting the sheet material while the sheet material passes over an arc of the roller surface, at least two electrically conducting segments positioned on the roller flush with the surface of the roller in spaced relationship across the width of the roller, on a line collinear with the roller axes, with each segment covering a circumferential arc of less than 180 degrees, spaced electrically conducting contact members on the roller, one for each electrically conducting segment, and each contact member in electrical conductive communication with its associated conducting segment, a voltage supply, two stationary brushes connected to the voltage supply and adapted to make contact with two contact members only during the period that the two conducting segments associated with said two contact members are passing through the sheet-supporting arc of the roller surface, and a current meter for measuring the flow of current in the electrical circuit including the voltage supply and the sheet material between said two conducting segments.

4. Apparatus as claimed in claim 3 in which the roller is hollow, the electrically conducting segments extend into the hollow region of the roller to form contact members and the stationary brushes are located within the roller so that they make and break contact with the contact members only during the period the segments are entirely within the sheet-support arc of the roller surface.

5. Apparatus as claimed in claim 3 in which the roller comprises an assembly of a plurality of electrically insulating discs wherein each insulating disc has at least a pair of electrically conducting segments spaced around its periphery which are interconnected electrically, said insulating discs being separated by electrically insulated spacing discs, the spaced conductive segments of each of the insulating discs being aligned parallel with the longitudinal axis of the roller and serving as contact members when not passing through the sheet-supporting arc of the roller surface.

6. Apparatus as claimed in claim 3 in which the angle subtended by each segment of the roller is less than one half of the angle subtended by the sheet-supporting arc of the roller surface.

References Cited

UNITED STATES PATENTS

| 1,623,436 | 4/1927 | Peschl | 324—65 |
| 1,821,605 | 9/1931 | Andersen | 324—65 |
| 2,171,363 | 8/1939 | Gulliksen | 324—65 |
| 2,445,271 | 7/1948 | Huebner | 317—2 |
| 2,576,882 | 11/1951 | Koole et al. | 317—2 |
| 2,653,298 | 9/1953 | McKinley | 324—65 |
| 2,659,048 | 11/1953 | Zabel et al. | 324—65 |
| 2,811,691 | 10/1957 | Dahm et al. | 324—65 |
| 2,849,676 | 8/1958 | Collins | 317—2 XR |
| 2,942,352 | 6/1960 | Eicken-Estienne | 324—65 XR |

FOREIGN PATENTS

| 606,102 | 9/1948 | Great Britain. |
| 858,281 | 1/1961 | Great Britain. |
| 47,820 | 12/1931 | Norway. |

RUDOLPH V. ROLINEC, *Primary Examiner.*

WALTER L. CARLSON, *Examiner.*

E. E. KUBASIEWICZ, *Assistant Examiner.*